United States Patent
Hu et al.

(10) Patent No.: US 12,203,779 B2
(45) Date of Patent: Jan. 21, 2025

(54) ELECTROMAGNETIC NON-CONTACT ONLINE METERING COUNTING AND SPEED MEASUREMENT METHOD AND DEVICE FOR STEEL WIRE

(71) Applicant: JIANGYIN TIANRUN INFORMATION TECHNOLOGY CO., LTD, Wuxi (CN)

(72) Inventors: Yangyong Hu, Wuxi (CN); Zhouyi Hu, Wuxi (CN)

(73) Assignee: JIANGYIN TIANRUN INFORMATION TECHNOLOGY CO., LTD, Wuxi (CN)

( * ) Notice: Subject to any disclaimer, the term of this patent is extended or adjusted under 35 U.S.C. 154(b) by 0 days.

(21) Appl. No.: 18/677,531

(22) Filed: May 29, 2024

(65) Prior Publication Data

US 2024/0361152 A1    Oct. 31, 2024

Related U.S. Application Data

(63) Continuation of application No. PCT/CN2023/125364, filed on Oct. 19, 2023.

(30) Foreign Application Priority Data

Feb. 3, 2023 (CN) .......................... 202310054812.3

(51) Int. Cl.
*G01D 5/20* (2006.01)
(52) U.S. Cl.
CPC ....................................... *G01D 5/20* (2013.01)
(58) Field of Classification Search
CPC ....................................................... G01D 5/20
See application file for complete search history.

(56) References Cited

U.S. PATENT DOCUMENTS

| | | | |
|---|---|---|---|
| 4,933,637 A * | 6/1990 | Ueda | G01R 33/04 324/253 |
| 5,353,010 A | 10/1994 | Sanetra | |

(Continued)

FOREIGN PATENT DOCUMENTS

CN    113125549 A    7/2021

OTHER PUBLICATIONS

Li Xihua et al., Journal of Chongqing Technology and Business University (Natural Science Edition), Research into online length measuring machine of wire strand, Jun. 2006, pp. 263-265, vol. 23, Issue 3.

(Continued)

*Primary Examiner* — Akm Zakaria (57) ABSTRACT

An electromagnetic non-contact online meter counting and speed measurement method and device for a steel wire are provided. An axial excitation device and an internally pass-through magnetic-sensitive detector sensor are disposed sequentially at intervals in an advancing direction of a steel wire. When the axial excitation device is excited by a narrow pulse voltage, the internally pass-through magnetic-sensitive detection sensor detects remanence around the steel wire in real time. When a magnetic null point is detected, a control system sends a narrow pulse excitation trigger instruction to enable a next excitation and detection process, and increases a meter counting value by a value corresponding to one meter counting pitch. The excitation is performed cyclically until it is ended. It calibrates an error caused by diameter and material changes and vibration of a detected steel wire.

13 Claims, 7 Drawing Sheets

(56) References Cited

U.S. PATENT DOCUMENTS

| | | | | |
|---|---|---|---|---|
| 5,517,104 | A * | 5/1996 | Kawakami | G01R 19/20 324/117 R |
| 2008/0040004 | A1 * | 2/2008 | Breed | G01S 7/023 701/45 |
| 2010/0181991 | A1 | 7/2010 | Roellgen et al. | |
| 2012/0071782 | A1 * | 3/2012 | Patil | A61B 5/0538 702/65 |
| 2013/0009659 | A1 * | 1/2013 | Liu | G01R 33/09 324/756.02 |
| 2013/0043863 | A1 | 2/2013 | Ausserlechner et al. | |
| 2021/0382007 | A1 * | 12/2021 | Zheng | G01N 27/83 |

OTHER PUBLICATIONS

Shao Lin et al., Automation and instrumentation, Application of electromagnetic marking based on LabVIEW in galvanized steel wire, 2012, pp. 119-120, Issue 3.

Liu Tao et al., Transactions of China Electrotechnical Society, Residual Flux Measuring Method on the Core of Ferromagnetic Components Based on Alternating Polarity DC Voltage Source, Jul. 2017, pp. 137-144, vol. 32, Issue 13.

* cited by examiner

ELECTROMAGNETIC NON-CONTACT ONLINE METERING COUNTING AND SPEED MEASUREMENT METHOD AND DEVICE FOR STEEL WIRE

CROSS-REFERENCE TO RELATED APPLICATIONS

This application is a continuation of International Patent Application No. PCT/CN2023/125364 with a filing date of Oct. 19, 2023, designating the United States, and further claims priority to Chinese Patent Application No. 202310054812.3 with a filing date of Feb. 3, 2023. The content of the aforementioned applications, including any intervening amendments thereto, are incorporated herein by reference.

TECHNICAL FIELD

The present disclosure relates to the technical field of online meter counting and speed measurement of steel wires (or ropes), and in particular, to an electromagnetic non-contact online meter counting and speed measurement method and device for a steel wire, which are suitable for high-speed production of steel wire products of different specifications, including small-specification products.

BACKGROUND

In a production and manufacturing process of a steel wire and its products, a length of a finished product is an important quality indicator. Precise control of the length of the finished product is one of important quality criteria. Accuracy of the length directly affects a yield and production efficiency. For example, a length of a steel wire for a bridge may be greater than a required length but must not be less than the required length. Once the length of the steel wire is less than the required length, the steel wire will become a waste. For some types of steel wires, for example, a steel wire for making a fixed-length rope, and a steel cord for a tire, many steel wires need to be twisted together. In this case, a length of a finished rope is limited to a shortest steel wire, while surplus parts are production wastes.

In a current steel wire production process, a most common online meter counting method is to perform meter counting by using a meter counting wheel. An advancing steel wire is wrapped or stitched onto a standard-length wheel, and friction force drives the wheel to rotate. An inductive switch detects the rotation of the wheel, and one revolution of the wheel is a standard length. An advancing length of the steel wire is calculated based on a quantity of revolutions of the wheel in an advancing process. This method has a significant error mainly due to the following two shortcomings that cannot be overcome:
  1: The steel wire is cylindrical. The meter counting wheel only comes into linear contact with a surface of the steel wire, resulting in small contact area and low friction force. There is uncertain slipping between the surface of the steel wire and the meter counting wheel during operation.
  2: After the meter counting wheel is used for a period of time, there will be wear on a surface of the meter counting wheel. An actual length of the meter counting wheel after the wear differs from an original length of the meter counting wheel. In actual use, it is necessary to periodically verify the meter counting wheel and modify its parameters. Because the wear is slow and continuous, there is always an unresolved deviation before and after the parameter modification.

In terms of measuring a length of a steel wire rope, some literatures have described a non-contact measurement method in which an electromagnetic marker is used to measure the length. A point of the steel wire rope is first magnetized by using an excitation and magnetization device, and then the magnetized point is detected. Then the excitation magnetization device is used repeatedly to magnetize a subsequent point of the steel wire rope, and so on. The length of the measured steel wire rope is determined based on a quantity of times of detecting the magnetized point.

This method has a potential to be applied to a large-specification low-speed advancing steel wire rope. This method can avoid the shortcomings of the aforementioned method for meter counting by using the meter counting wheel. However, this method has an unavoidable defect when being applied to measure a length of a small-specification high-speed advancing steel wire.

The utility model with Patent Application No. 00223049.6 and entitled "Length Measurement Device for Steel Wire Rope" adopts a following method, including: "disposing a wheel with a magnetizing coil and at least one fixed induction coil or magnetic head next to a measured steel wire rope", "disposing at least one group of magnetizing coils, with each magnetizing coil oppositely disposed between steel wire ropes", and "making the magnetizing coil and the wheel as close as possible to each other and not in contact with the steel wire rope". This method adopts a magnetic field perpendicular to an axial direction of a steel wire to excite a point on an axis of the steel wire. After a certain distance from the magnetized point, a detection sensor installed on an external detection wheel is used to detect the magnetized point, so as to find the magnetized point and start next magnetization. In this way, meter counting is cyclically performed. This method can be used for low-accuracy meter counting and detection of the large-specification low-speed advancing steel wire rope.

However, for the small-specification high-speed advancing steel wire such as a rubber hose steel wire, a diameter of the steel wire is less than 1 mm and even is only 0.1 mm, and an advancing speed reaches up to 1000 m/min. In addition, the steel wire vibrates and rotates during high-speed advancing. Therefore, a distance between the magnetizing coil and the steel wire is unstable, resulting in an inconsistent magnetization effect and an uncertain remanence curve. What's more, a spacing and an angle between the detection wheel and the steel wire are unstable, resulting in a poor detection effect. It is difficult to determine a magnetization trigger position at a detection site. Therefore, it is difficult to achieve high accuracy when this method is used to perform meter counting and detection on the small-specification high-speed advancing steel wire.

Published in the Journal of Chongqing University of Business and Technology (Natural Science Edition) in June 2006, the article Development of Online Length Measurement Instrument of Steel Wire Rope proposes the following method: After a ferromagnetic material of a detected point is magnetized by using an excitation device, remanence is generated on the ferromagnetic material. A magnetic field intensity of the remanence rapidly decays along two sides centered at the detected point. Once the ferromagnetic material that retains the remanence passes through a coil during movement, an induced electromotive force proportional to an intensity of the remanence is generated. It is obvious that a signal induced by a segment that is of a steel wire rope and corresponds to a moment at which the steel wire rope passes through the excitation device and is magnetized is strongest.

This method uses the excitation device to excite a single point on the steel wire rope. This generates the remanence whose "magnetic field intensity rapidly decays along the two sides centered at the detected point". For the small-specification high-speed advancing steel wire, this method also has problems of the unstable distance between the magnetizing coil and the steel wire, the inconsistent magnetization effect, and the uncertain remanence curve.

In addition, this method uses an induction coil to detect a running remanence marker. When the steel wire passes through the induction coil, regardless of an angle of a magnetized point during single-point excitation, the induction coil can consistently detect the magnetized point. However, because a response of the induction coil to the remanence marker is proportional to a change rate of a magnetic flux, induced voltages caused when remanence markers with consistent waveforms pass through the induction coil are linearly related to relative running speeds of the remanence markers with the consistent waveforms. For a high-speed advancing steel wire, different induced voltages are generated due to different advancing speeds. Therefore, this method cannot confirm the magnetized point through comparison with a fixed voltage. Therefore, the article proposes to find a point with maximum remanence on the steel wire through maximum value detection. When a signal induced by a point that is on the steel wire rope and corresponds to the moment at which the steel wire rope passes through the excitation device and is magnetized has a maximum amplitude, this point is recorded. In addition, a controller is used to immediately send a pulse signal of a magnetic marker to magnetize the point of the steel wire rope at a current excitation coil, leaving a remanence marker. However, a time point at which it is detected and confirmed that the amplitude of the induced signal is maximum is no longer a time point at which the point with the maximum amplitude of the induced signal passes through the induction coil. If next magnetization is excited at this moment, an uncertain time deviation is caused. This causes an unacceptable length deviation for the high-speed advancing steel wire.

In summary, at present, the most common meter counting and speed measurement method for the steel wire is the traditional meter counting method using the meter counting wheel. This method cannot avoid an error caused by slipping, wear, and a wire diameter change due to contact, and cannot achieve high-accuracy meter counting. An electromagnetic method described in the present disclosure can also be used. The electromagnetic method performs meter counting and speed measurement by cyclically labeling a point with a magnetic marker on an advancing steel wire rope, performing count accumulation after detecting the point, and labels a next point with a magnetic marker. However, in such existing scheme, after a point in the axial direction of the steel wire is magnetized, a remanence waveform decaying towards both sides centered on the point is formed the in the axial direction. A subsequent detection circuit detects and compares a magnetic induction intensity of the remanence to find a maximum value or a specified value, in order to determine an excitation position.

In a practical application, it is difficult to generate stable remanence during magnetization of one point, so this method is not applicable. Due to different specifications of steel wires, different production speeds, and machine vibrations during operation in a production process, a change in a distance between the steel wire and a magnetization device and a magnetization effect are different for each magnetization. Therefore, a maximum magnetic induction intensity of the remanence and a magnetic induction intensity waveform of the remanence are different for each magnetization. Therefore, the method for determining a marker of an excited point in such a manner is unreliable and cannot meet a practical requirement. Therefore, this method has not been widely applied in the industry at present.

In order to achieve high-accuracy meter counting and speed measurement by using an electromagnetic method, a magnetization and detection method is needed. The magnetization and detection method can stably and reliably determine a marker of a magnetized point during magnetization, reliably detect and determine the magnetized point after the magnetization, and cyclically execute a next magnetization and detection process. The magnetization and detection method can be applied to small-specification steel wires, can adapt to steel wires of different specifications and different production speeds, and is insensitive to a certain degree of vibration of the steel wire.

SUMMARY OF PRESENT INVENTION

In order to avoid an error caused by vibration of a steel wire when meter counting and speed measurement are performed on the steel wire (or rope) by using an electromagnetic method, the present disclosure provides a detection method and device that can stably and reliably determine a marker of a magnetized point during magnetization, reliably detect and determine the magnetized point after the magnetization, and cyclically execute a next magnetization and detection process. The method can be applied to small-specification steel wires, can adapt to steel wires of different specifications and different production speeds, and is insensitive to a certain degree of vibration of the steel wire.

To resolve the above technical problem, the present disclosure provides the following technical solutions.

A method in the present disclosure is different from an existing method for magnetizing a point of a steel wire.

In the present disclosure, when a steel wire advances axially and passes through an axial excitation device, the steel wire enters the axial excitation device from one magnetic pole and comes out of the axial excitation device from the other magnetic pole. Preferably, an axial direction of the steel wire is parallel to a direction of a magnetic line of force at a center of a magnetic pole that generates a magnetizing field when the axial excitation device is excited.

When a magnetization device is excited by a narrow pulse voltage, a magnetizing field is formed between two poles of the magnetization device. The two poles are a pair of symmetrical magnetic poles, and a direction of the magnetic field points from one pole to the other. Therefore, a segment that is of the axially advancing to-be-detected steel wire and within a region related to the two symmetrical magnetic poles of the magnetization device is magnetized. In a magnetization process, remanence is generated on the magnetized steel wire segment.

The remanence has following characteristics: Around the steel wire, a magnetic field intensity of measurable remanence in a normal direction of the steel wire follows a characteristic distribution along the axial direction. Specifically, starting from zero, the magnetic field intensity gradually increases to a maximum value in a direction, decreases to zero, increases to a maximum value in a opposite direction, and then gradually decreases to a null point, forming a locally symmetrical characteristic waveform centered on a magnetic null point. According to a principle of symmetry, a magnetic induction intensity of remanence at the center point of symmetry is zero, corresponding to a position of a point that is on the steel wire and located a center point of a magnetized region during the excitation.

Around the steel wire, a magnetic sensitive sensor can be used to detect a magnetic induction intensity of the remanence on the magnetized segment. After a remanence signal is detected, null point comparison and detection of the remanence are enabled to determine the point that is on the steel wire and located at the center point of the magnetized region during the excitation. When the magnetic null point is detected, a control system increases a meter counting value by a value corresponding to a meter counting pitch, and sends an excitation trigger command to the axial excitation device to enable next excitation and magnetic null point detection. The excitation is performed cyclically until the excitation is ended.

In addition, for a part less than one step during parking, a method for detecting, analyzing, and calculating a speed during the parking is adopted to make accurate compensation, avoiding a meter counting error thereout. Specifically, acceleration and deceleration during mechanical transmission are currently all achieved under electrical control, and can be approximated as straight-line calculation within adjacent short time intervals:

Firstly, an accelerated speed during the parking is calculated based on two pulses before the parking:

$$a = 2*(L/t_1 - L/t_2)/(t_1 + t_2)$$

In the above formula, L represents a unit length; t1 and t2 represent the first two time intervals; and a represents an average accelerated speed between the two pulses.

Secondly, a speed at an end of a last pulse is calculated based on the time interval t2 of the last pulse:

$$V = L/t_2 - at_2/2$$

Finally, a length after the end of the last pulse is calculated according to S=V2/2a.

An electromagnetic non-contact online meter counting and speed measurement device for a steel wire includes a magnetization device and an internally pass-through magnetic-sensitive detection sensor. The magnetization device and the internally pass-through magnetic-sensitive detection sensor are sequentially disposed on an advancing route of a steel wire. Two magnetic poles of the magnetization device are designed to be symmetrical based on a center point. The steel wire sequentially passes through the magnetization device and the internally pass-through magnetic-sensitive detection sensor.

The axially advancing steel wire axially and vertically passes through the magnetization device from a midpoint of the symmetrical magnetic poles of the magnetization device.

The axial magnetization device is excited by a narrow pulse voltage to generate a magnetic field between the two symmetrical magnetic poles. Magnetic field intensities at the two poles are equal in magnitude but opposite in direction. Preferably, a magnetic line of force at the midpoint of the magnetic poles is parallel to an axial direction of the steel wire passing through the midpoint. The steel wire within a range of the magnetization device is covered with the magnetic line of force.

A segment that is of the steel wire and located inside and nearby the two symmetrical magnetic poles is axially magnetized. Remanence with a characteristic waveform distribution is generated on the steel wire segment. Remanence with a characteristic waveform distribution along the axial direction can be detected by the circumferentially and uniformly distributed magnetic-sensitive detection sensor. Starting from zero, a magnetic field intensity of the remanence gradually increases to a maximum value in a direction, decreases to zero, increases to a maximum value in a opposite direction, and then gradually decreases to a null point, forming a locally symmetrical characteristic waveform centered on a magnetic null point. The magnetic null point corresponds to a point on a vertical plane of the midpoint of the symmetrical magnetic poles of the magnetization device when the steel wire is magnetized.

The internally pass-through magnetic-sensitive detection sensor includes a circumferentially and uniformly distributed magnetic-sensitive device array and its signal processing circuit. The internally pass-through magnetic-sensitive detection sensor is used to detect a magnetic field intensity around the steel wire. When an excitation device is not excited, the steel wire passing through the magnetization device has no remanence, and the sensor detects a potential signal corresponding to the null point of the magnetic field intensity. As the steel wire advances, the magnetized steel wire segment with the remanence passes through the internally pass-through magnetic-sensitive detection sensor. The internally pass-through magnetic-sensitive detection sensor continues to detect a remanence signal on the steel wire, converts the remanence signal into an electrical signal in real time, and transmits the electrical signal to a control system.

The control system receives information transmitted by the internally pass-through magnetic-sensitive detection sensor and analyzes the information in real time to confirm that a signal detected by the current sensor no longer corresponds to a zero magnetic field intensity. When the signal exceeds a set threshold, it is confirmed that the above characteristic remanence begins to pass through the sensor, and the axially magnetized steel wire segment is passing through the sensor when the magnetization device is excited by a narrow pulse.

The control system makes real-time determining to confirm that a center point of the above characteristic remanence is detected. In this case, if a point that is on the steel wire and corresponds to a detection position of the sensor is at a central position of the magnetization device when this steel wire segment is magnetized, next excitation and magnetization is immediately triggered.

As a result, the magnetization device is excited, and a related to-be-detected steel wire segment within the symmetrical poles of the magnetization device is magnetized. Characteristic remanence is generated on this steel wire segment. During advancing, this steel wire segment passes through the internally pass-through magnetic-sensitive detection sensor. When the system obtains a center point of the characteristic remanence in real time, a next excitation and magnetization cycle is triggered. An advancing distance of the steel wire between two excitation operations is fixed and known, which is equal to a distance between the midpoint of the two symmetrical poles of the magnetization device and the detection position of the sensor. Based on this, calculation and accumulation are performed to achieve high-accuracy online meter counting. (This is a method for determining a to-be-excited point based on a waveform characteristic of the remanence.)

When meter counting is enabled, the axial excitation device is excited for the first time to generate a magnetized segment containing remanence with a characteristic waveform on the steel wire. After detecting the magnetized segment, the control system enables null point comparison and detection of the remanence. When the magnetic null point is detected, the control system increases a meter counting value by a value corresponding to one meter counting pitch, and issues an excitation trigger command to the axial excitation device to enable next excitation and magnetic null point detection. The excitation is performed cyclically until the excitation is ended. By detecting that a voltage on the steel wire is not zero or exceeds a determined value, the control system can determine whether the magnetized segment is detected. This value can be determined during debugging. For example, this value is flexibly set to 50% or 60% of maximum remanence to improve detection accuracy.

Compared with existing cyclic excitation, detection, and meter counting technologies, the present disclosure has the following advantages:

1. Different Excitation and Magnetization Methods

As described in existing literatures, an excitation method for a steel wire is to excite a point of the steel wire to magnetize the steel wire to generate remanence with a magnetic field intensity rapidly decaying along both sides centered on the point. However, the excitation method has following drawbacks:

Vibration of the steel wire changes a distance between the steel wire and a magnetic pole. This changes an effective magnetic flux during the magnetization and makes the remanence on the steel wire instable. Both a material change (affecting a magnetic induction intensity) and a diameter change (changing magnetization area) of the steel wire make the remanence on the steel wire more instable.

In the present disclosure, an axially advancing steel wire passes through a region of a magnetic field generated by excitation of a magnetization device to axially excite the magnetization device by a narrow pulse voltage. A corresponding magnetic field is generated to magnetize the steel wire nearby a region of the magnetic field. In this way, the steel wire is magnetized, and remanence for which a characteristic waveform can be detected is generated. When the remanence is detected by a circumferentially and uniformly distributed magnetic-sensitive detection sensor, it is found that starting from zero, a magnetic field intensity of the remanence gradually increases to a maximum value in a direction, decreases to zero, increases to a maximum value in a opposite direction, and then gradually decreases to a null point, forming a locally symmetrical characteristic waveform centered on a magnetic null point. The zero-crossing center point of symmetry corresponds to a point on a vertical plane of a midpoint of symmetrical magnetic poles of the magnetization device when the steel wire is magnetized.

In this regard, the present disclosure has the following advantages:

During excitation, a steel wire segment inside and nearby an excitation device is magnetized into a cylindrical magnet. In this way, the vibration of the steel wire does not change a magnetic flux during excitation and magnetization and a status of a magnetic path of the magnetized steel wire. The vibration of the steel wire does not affect the remanence on the magnetized steel wire. Both the material change (affecting the magnetic induction intensity) and the diameter change (changing the magnetization area) of the steel wire cause uncertainty to a remanence intensity on the magnetized steel wire, but do not change a characteristic of a waveform of a magnetic induction intensity of the remanence.

2. Different Detection and Analysis Methods

Both the material change (affecting the magnetic induction intensity) and the diameter change (changing the magnetization area) of the steel wire change the magnetic path and the characteristic during the magnetization. The waveform of the magnetic field intensity of the remanence on the steel wire is significantly lengthened with an increase in a diameter, and a maximum remanence intensity increases or changes as a magnetic permeability of a material increases or changes.

As described in the existing literatures, there are detection methods for meter counting in this way. In some of the detection methods, a magnetic induction switch or a magnetic head installed on a side face is used. These detection methods are unreliable for a high-speed advancing steel wire with vibration and even cannot be implemented for a thin steel wire. In some detection methods, an induction coil is also used to detect an induced voltage. A speed change causes a change in the induced voltage. Therefore, during detection and analysis, a reference voltage and its corresponding position when the magnetization device is excited cannot be determined.

In some analysis methods, a magnetic field intensity of the remanence is found to determine next excitation and counting. As mentioned above, due to various reasons, the magnetic field intensity of the remanence and a related position cannot be accurately matched, making it unsuitable for precise meter counting.

In some analysis methods, a maximum value is found to determine the next excitation and counting. When a reliable maximum value is found, a lag is caused, resulting in an uncertain time deviation. This causes an unacceptable length deviation for a high-speed advancing steel wire.

The present disclosure detects remanence with a characteristic waveform distribution by using an internally pass-through magnetic-sensitive detection sensor, converts the remanence with the characteristic waveform distribution into a corresponding electrical signal with a characteristic waveform distribution. The system detects and determines in real time a magnetic null point of the remanence on the steel wire corresponding to the midpoint of the symmetrical magnetic poles at a moment of excitation, and immediately triggers next excitation and magnetization. In this way, excitation and detection are performed cyclically, achieving high-accuracy online meter counting.

To sum up, the present disclosure has the following advantages:

1: The present disclosure triggers next excitation by detecting a magnetic null point of characteristic remanence of an axially magnetized steel wire segment. This does not cause an inconsistent deviation between a detection signal and an actually magnetized position due to an inconsistent remanence intensity. This avoids a deviation caused by the inconsistent remanence intensity due to the diameter and material changes of the detected steel wire.

2: The present disclosure adopts the magnetic-sensitive detection sensor to solve a problem that the detection signal varies with the speed change in the induction coil method. In addition, the sensor is of an internally pass-through type and composed of circumferentially and uniformly distributed magnetic-sensitive device arrays. Symmetry of the sensor is combined with symmetry of the remanence on the steel wire, which avoids signal instability caused by the vibration of the steel wire. What's more, the internally pass-through sensor also makes it possible to detect a steel wire of a smaller specification.

To sum up, the detection method in the present disclosure ensures a consistent and reliable distance between a position of a pulse characteristic point on the magnetization device and a detection point on the sensor. Combined with an arithmetic system with a microprocessor as a core, a correct pulse interval length (a distance between the position of the pulse characteristic point on the magnetization device and the detection point on the sensor) is set through conventional instrument calibration and debugging, making high-accuracy meter counting possible.

BRIEF DESCRIPTION OF THE DRAWINGS

The accompanying drawings are provided for further understanding of the present disclosure and constitute a part of the specification. The accompanying drawings, together with the embodiments of the present disclosure, are intended to explain the present disclosure, rather than to limit the present disclosure. In the accompanying drawings.

DETAILED DESCRIPTION OF THE EMBODIMENTS

The preferred embodiments of the present disclosure are described below with reference to the accompanying drawings. It should be understood that the preferred embodiments described herein are only used to illustrate the present disclosure, rather than to limit the present disclosure.

Embodiment

Figure 3:
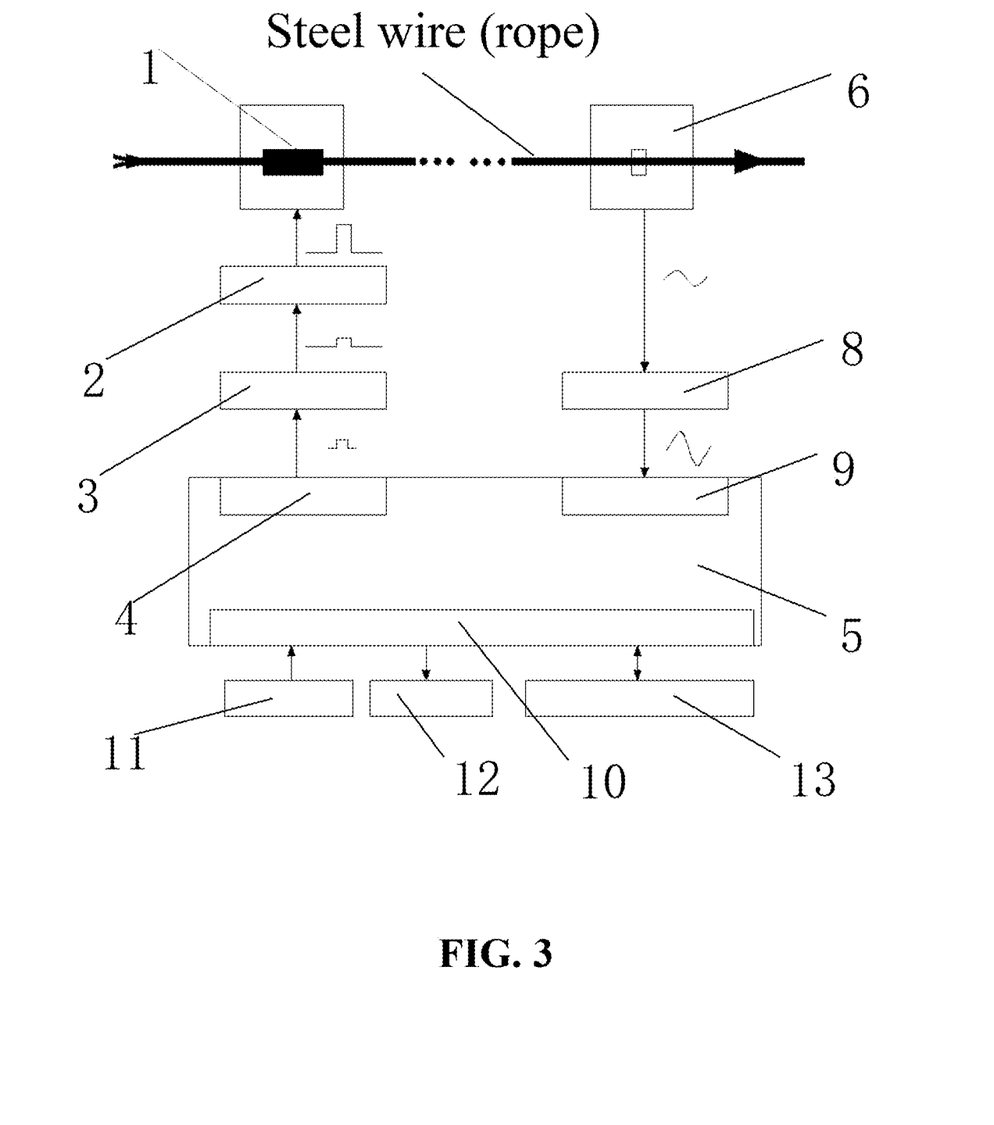
FIG. 3 is a system chart of an embodiment.

As shown in FIG. 3, an electromagnetic non-contact online meter counting and speed measurement device for a steel wire includes an axial excitation device 1 with a straight solenoid as a main body, an excitation trigger unit 4, an excitation driving unit 2, a narrow pulse generation unit 3, a control system 5, an internally pass-through and circumferentially and uniformly disposed magnetic sensor 6, a signal processing unit 8, and a signal collection circuit 9.

As a core processing unit, the control system 5 controls an entire process of the online meter counting and speed measurement device for a steel wire. In a process of generating remanence with a characteristic distribution, the control system 5 determines and generates an excitation instruction for the remanence with the characteristic distribution, and sends the excitation instruction to the excitation trigger unit 4. The control system 5 adopts a microprocessor as a core component, receives information from an input/output interface, including a relevant parameter setting, a machine operation status, and information of the magnetic-sensitive detection sensor, and analyzes and processes the information to complete high-accuracy meter counting.

The excitation trigger unit 4 can be disposed in the control system 5. Instructed by the control system 5, the excitation trigger unit 4 immediately generates a pulse and outputs the pulse to the narrow pulse generation unit 3 as an instruction for generating a narrow pulse.

The narrow pulse generation unit 3 receives a signal with a narrow pulse width from the control system 5 and a narrow pulse excitation trigger instruction from the excitation trigger unit 4. When receiving the narrow pulse excitation trigger instruction, the narrow pulse generation unit 3 immediately generates a narrow pulse control signal based on a narrow pulse width instruction provided by the control system 5, and outputs the narrow pulse control signal to the excitation driving unit 2.

The excitation driving unit 2 receives the narrow pulse control signal from the narrow pulse generation unit 3, and outputs a narrow pulse voltage excitation power supply to the axial excitation device 1 to excite the axial excitation device 1 to generate a magnetizing field.

In the axial excitation device 1, the straight solenoid is uniformly and densely wound, and is installed on a fixed installation bracket together with an inlet guide wheel to form the axial excitation device. After being guided by the inlet guide wheel, the advancing steel wire enters a through-hole of the solenoid from one end of the solenoid, and comes out of the solenoid from the other end of the straight solenoid. Two electrical connection points of the solenoid are electrically connected to a positive terminal V12+ of a driving source and an output terminal of the excitation driving unit respectively.

When the axial excitation device 1 is excited by a narrow pulse voltage, a magnetizing field is formed inside and at the two ends of the straight solenoid. The two ends of the straight solenoid are provided with a pair of symmetrical magnetic poles. In this case, a segment that is of the axially advancing to-be-detected steel wire and within the magnetizing field is magnetized. In a magnetization process, the remanence with the characteristic distribution is generated on the magnetized steel wire segment.

Around the steel wire, a magnetic field intensity is measured in a normal direction of the steel wire, and a magnetic field intensity of a remanence-free steel wire segment is a magnetic null point. A magnetic field intensity of the remanence-available steel wire segment and magnetic field intensities of steel wire segments before and after the remanence-available steel wire segment have a characteristic distribution along an axial direction. Specifically, starting from the magnetic null point of the remanence-free steel wire segment, the magnetic field intensity gradually increases to a maximum value in a direction, decreases to zero, increases to a maximum value in a opposite direction, and then gradually decreases to the magnetic null point of the remanence-free steel wire segment at an end of the remanence, forming a locally symmetric characteristic waveform centered on the magnetic null point. According to a principle of symmetry, a magnetic induction intensity of the remanence at the center point of symmetry is zero, corresponding to an axial point that is on the steel wire and located at a center of the straight solenoid of the excitation device 1 during narrow pulse magnetization and excitation.

A process of detecting the remanence with the characteristic distribution and determining a characteristic point is as follows:

The remanence with the characteristic distribution is detected by the internally pass-through magnetic sensor 6, which is located after the axial excitation device 1. In an advancing process of the steel wire, the internally pass-through magnetic sensor 6 detects the magnetic field intensity in the normal direction around the steel wire in real time, converts the magnetic field intensity into an electrical signal, and outputs the electrical signal to the signal processing unit 8.

Figure 7:
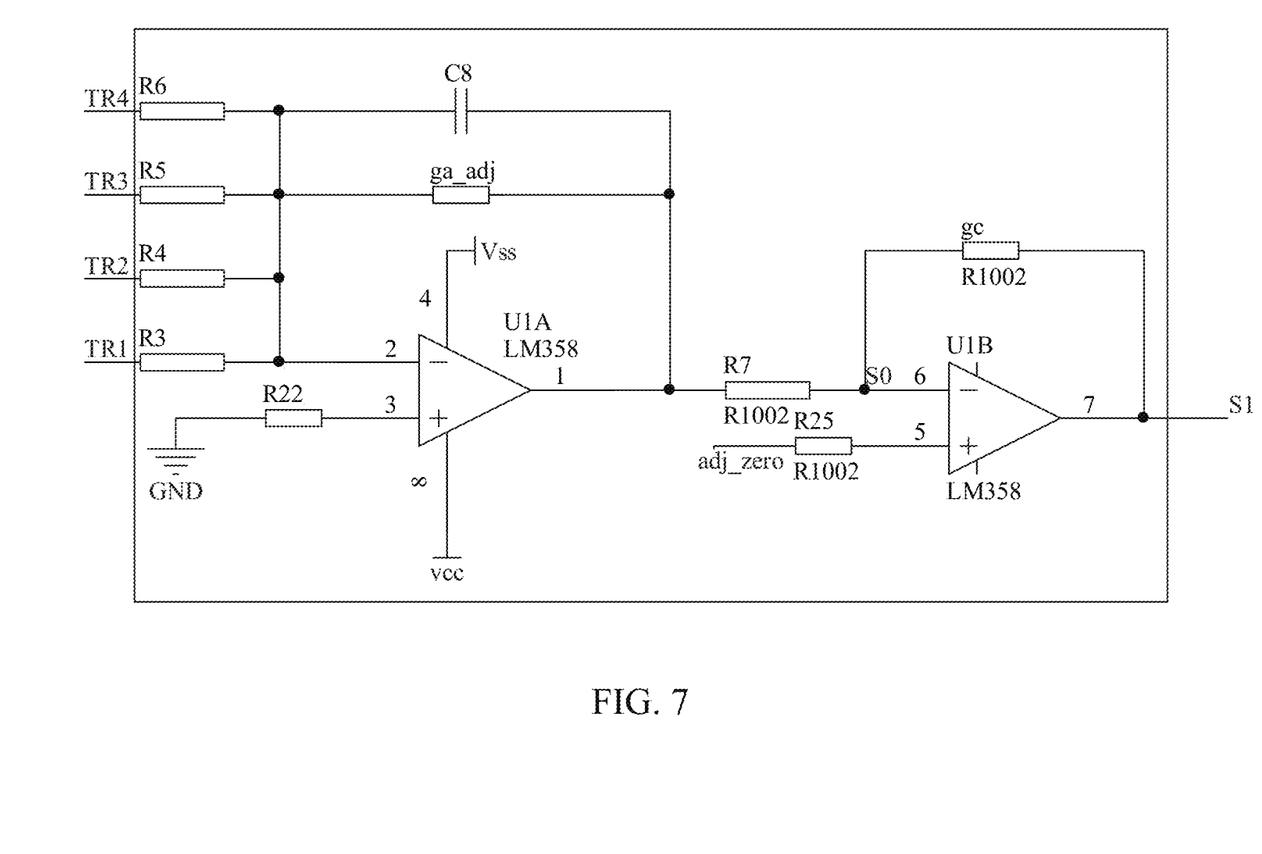
FIG. 7 is a schematic diagram of a signal processing unit.

An internal structure of the signal processing unit 8 is shown in FIG. 7. A voltage adjustment potentiometer for a case with no remanence is disposed to adjust a null offset of an output voltage. In this way, the magnetic null point of the remanence-free steel wire segment corresponds to a determinate output voltage. The signal processing unit 8 processes the electrical signal from the internally pass-through and circumferentially and uniformly disposed magnetic sensor 6, filters out a high-frequency interference wave from an electrical signal of each magnetic sensor, and performs an addition operation based on a proportion. An operation result is output to the control system 5 with the built-in signal collection circuit 9, and the control system performs analysis based on the operation result.

The signal collection circuit 9 is disposed in the control system 5 to receive an output signal from the signal processing unit 8 and perform analog-to-digital (A/D) conversion in real time for calculation by the control system 5.

The control system 5 analyzes data from the signal collection circuit 9 to determine whether there is remanence on a currently detected steel wire segment within the sensor.

The control system 5 also receives the output signal from the signal processing unit 8. When confirming that the currently detected steel wire segment in the sensor is a magnetized remanence-available steel wire segment, real-time comparison is performed to find the magnetic null point. In this way, the axial point that is on the steel wire and located at the center of the straight solenoid of the excitation device 1 during the narrow pulse magnetization and excitation is confirmed.

Figure 4:
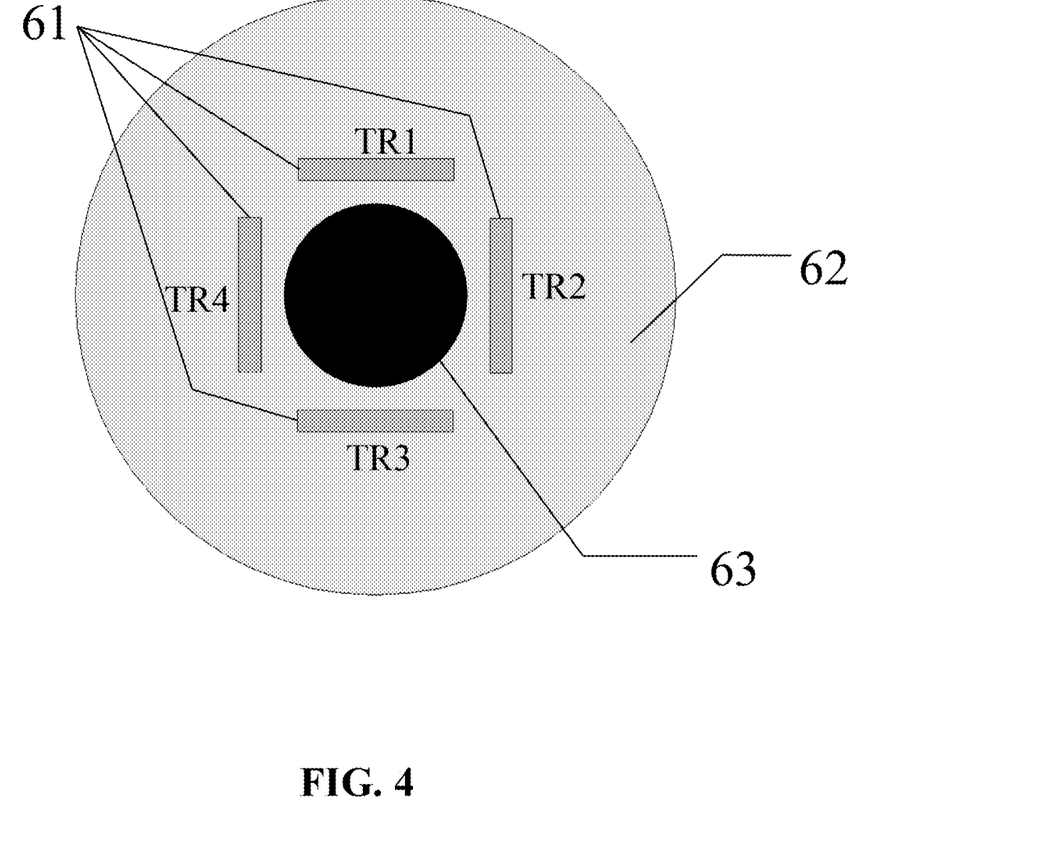
FIG. 4 is a schematic diagram of an internally pass-through magnetic-sensitive detection sensor.

FIG. 4 is a schematic diagram of a printed circuit board (PCB) of the internally pass-through magnetic sensor according to an embodiment. In this embodiment, the internally pass-through magnetic sensor is equipped with a cylindrical through-hole. The to-be-detected steel wire passes through the cylindrical through-hole, and preferably, passes through a centerline of the cylindrical through-hole. The internally pass-through magnetic sensor mainly includes the PCB provided with a circular through-hole, and the cylindrical through-hole passes through a circle center of the circular through-hole of the PCB. The PCB is provided with four magnetic sensors that are evenly and equidistantly distributed around the circular through-hole at a spacing of 90 degrees relative to the circle center. The PCB also includes a signal transmitter. The internally pass-through magnetic sensor also includes a mounting base and a guide wheel. The guide wheel and the PCB are fixed on the mounting base. The to-be-detected steel wire is guided by the guide wheel. The to-be-detected steel wire is axially perpendicular to the PCB, and passes through the through-hole within a certain range of a center of the PCB. A Hall element is preferably selected as the magnetic sensor. In FIG. 4, 61 represents the magnetic sensors TR1 to TR4, 62 represents the PCB, and 63 represents the through-hole of the PCB. The steel wire rope passes through the through-hole 63.

Figure 5:
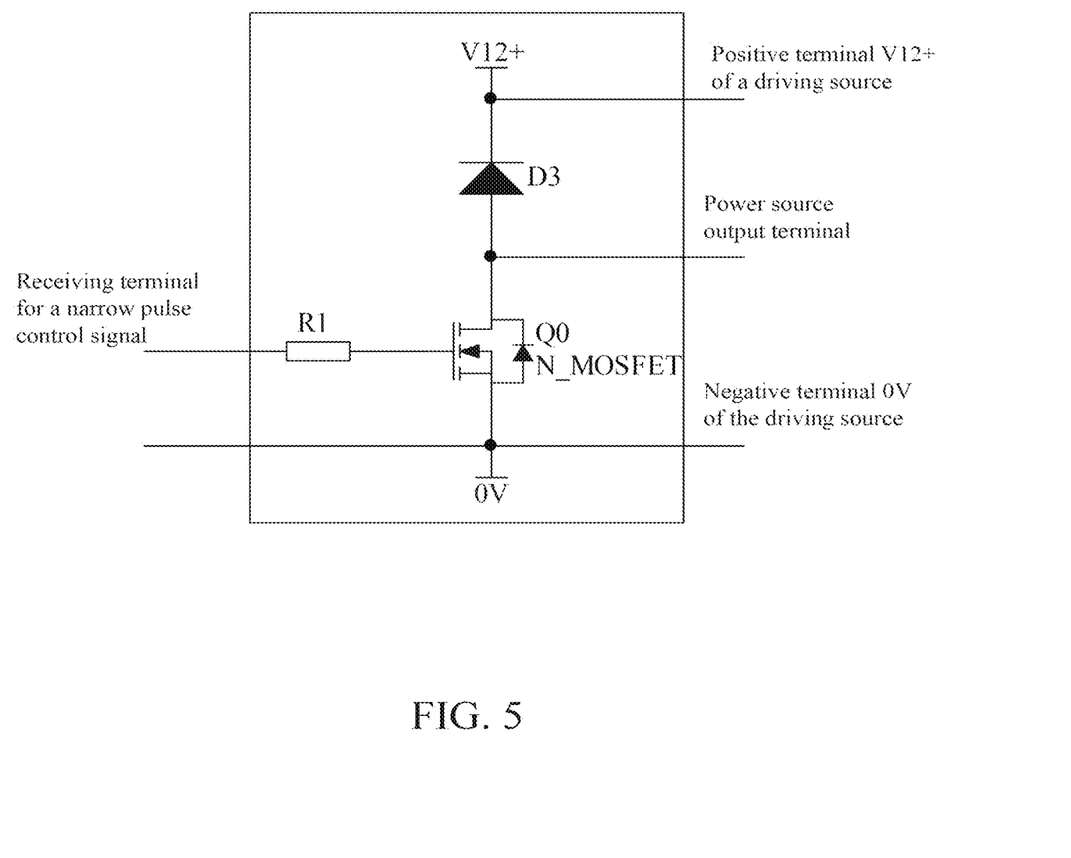
FIG. 5 is a schematic diagram of an excitation driving unit according to an embodiment.

FIG. 5 is a schematic diagram of the excitation driving unit according to an embodiment. The excitation driving unit includes a fast power switch transistor, a reverse discharge diode, a driving source connection point, a receiving terminal for receiving a pulse control signal, and an output terminal for outputting a power pulse voltage.

The receiving terminal for receiving the pulse control signal is connected to a trigger electrode of the fast power switch transistor. When the narrow pulse control signal is at a high potential, the fast power switch transistor is turned on to output a narrow pulse voltage waveform. An output terminal of the fast power switch transistor is electrically connected to the output terminal of the excitation driving unit. An anode of the reverse discharge diode is connected to the output terminal of the fast power switch transistor, and a cathode of the reverse discharge diode is connected to a positive terminal V12+ of a driving direct current (DC) source.

In this embodiment, the fast power switch transistor is an N-channel Metal Oxide Semiconductor Field Effect Transistor (MOFFET): CJU80N03. The reverse discharge diode is a high-speed switching diode 1N4148. The driving source is a 12V, 2A DC source, with V12+ for a positive terminal and 0V for a negative terminal.

The receiving terminal for receiving the pulse control signal is electrically connected to an output terminal of the narrow pulse control signal from the narrow pulse generation unit, and the output terminal is externally connected to one electrical connection point of the solenoid.

Figure 6:
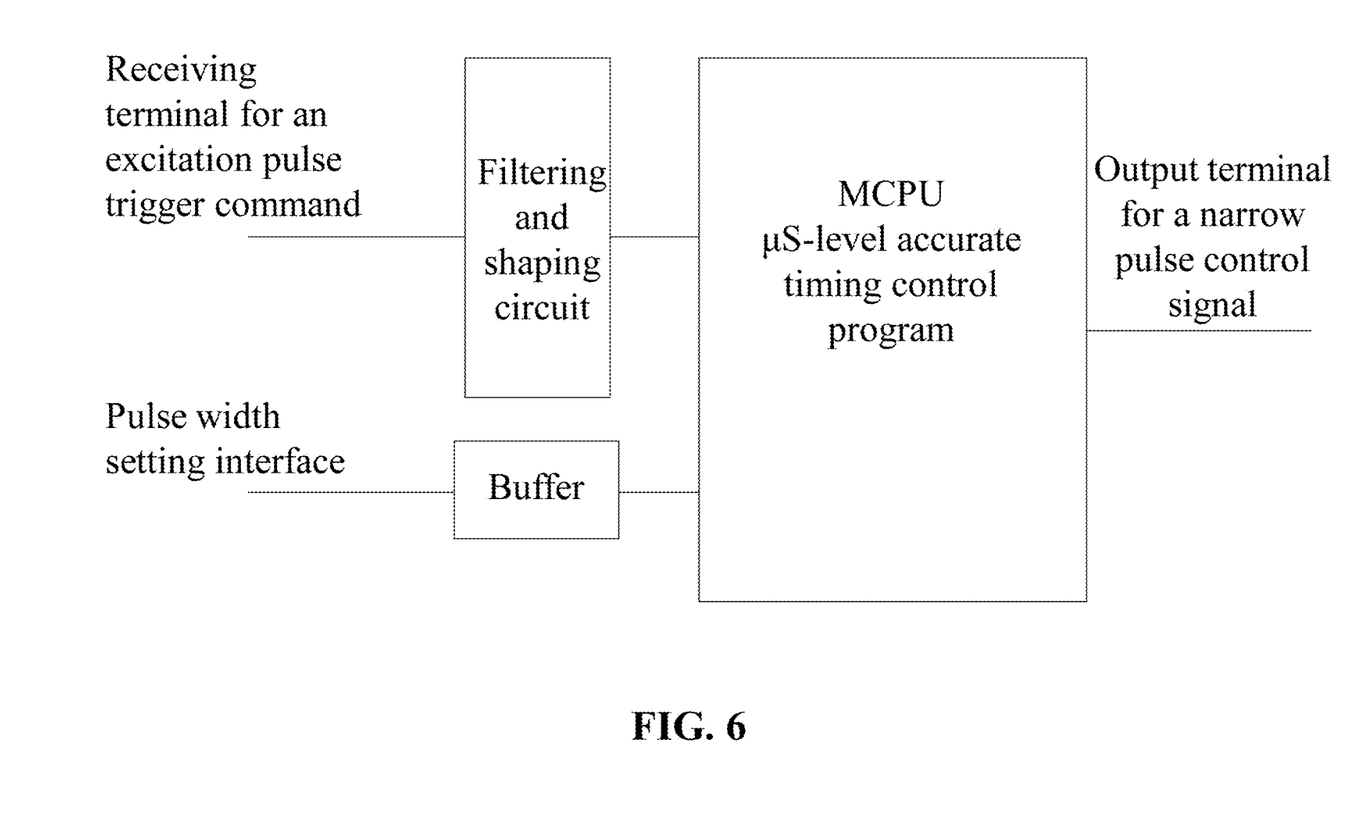
FIG. 6 is a schematic diagram of a narrow pulse generation unit.

FIG. 6 is a schematic diagram of the narrow pulse generation unit. The narrow pulse generation unit mainly includes a singlechip as a processing unit, a communication interface circuit, a digital input port, a filtering and shaping circuit for high-speed digital signal conditioning, and a pulse output circuit.

The communication interface circuit is connected to the control system to receive the signal with a narrow pulse width. The digital input port is connected to the excitation trigger unit of the control system to receive an excitation pulse trigger command. The pulse output circuit is connected to the receiving end that is of the excitation driving unit and receives the pulse control signal, to output the narrow pulse control signal to the excitation driving unit.

The excitation trigger unit can be disposed in the control system. Instructed by control system, the excitation trigger unit sends a one-bit logic signal to the narrow pulse generation unit as the narrow pulse excitation trigger instruction.

The control system adopts the microprocessor as the core component, receives the information from the input/output interface, including the relevant parameter setting, the machine operation status, and the information of the magnetic-sensitive detection sensor, and analyzes and processes the information to complete the high-accuracy meter counting. The control system includes the microprocessor and a related input/output interface.

In the parameter setting, a most important parameter is an adjustable meter counting pitch, namely, an accumulated length of each pulse. Accuracy of this parameter determines accuracy of a meter counting device, and this parameter usually needs to be accurate to 0.01 mm. Assemblies of the magnetization device and the magnetic sensor cannot be completely consistent, and the requirement often cannot be met in actual measurement. Therefore, in practice, conventional standard detection and parameter debugging usually need to be set. Firstly, this parameter is set based on an actual distance from an axial center point of the solenoid of the magnetization device to an induction position of the magnetic-sensitive detection sensor. During running for a period of time, a certain length of product is measured, and an actual length is obtained offline through standard measurement. After that, this parameter is modified and corrected based on measurement data and the actual length.

The parameter setting also includes a settable stop length during fixed-length production. The system compares a current meter counting value with the set stop length in real time, accurately sends a stop instruction, and enables a machine to perform the fixed-length production.

Information of the machine operation status includes machine operation and stop information, a length reset instruction, and the like.

When the machine is stopped, the length reset instruction is received to reset a meter counting length to 0 to prepare for next meter counting.

When the machine receives a start instruction and starts operation, the machine executes excitation trigger once, sends the narrow pulse excitation trigger instruction, and triggers a meter counting process of enabling cyclic excitation and detection.

The information of the magnetic-sensitive detection sensor reflects remanence information of the detected steel wire. An MCU of the control system receives the above information and obtains a voltage of the magnetic null point of the remanence when detecting an unmagnetized steel wire. When receiving a voltage that is different from the voltage of the magnetic null point of the remanence and deviates from a certain value, the MCU confirms that a magnetization pulse is detected, starts comparison detection for the magnetic null point of the remanence, and enables a corresponding interrupt. When the magnetic null point is determined, the interrupt is triggered. On one hand, the narrow pulse excitation trigger instruction is sent to initiate a next excitation and detection process. On the other hand, a meter counting value increases by a value corresponding to one meter counting pitch.

Figure 1:
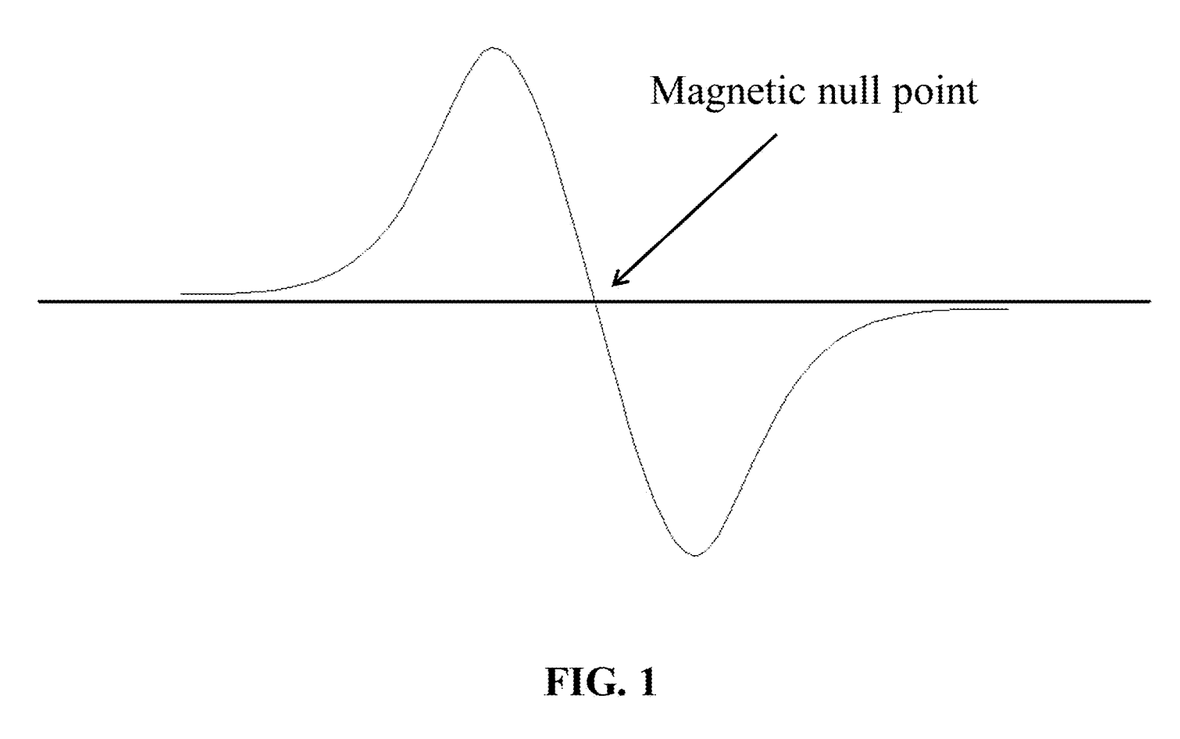
FIG. 1 shows a voltage waveform that represents a characteristic waveform distribution of remanence and is obtained through processing after a magnetic-sensitive detector sensor in a method in the present disclosure performs detection on a related circumference of a steel wire segment that has been magnetized according to the method in the present disclosure.

As shown in FIG. 7, the signal processing unit receives a voltage signal from the internally pass-through and circumferentially and uniformly disposed magnetic sensor, filters out a high-frequency interference wave from a voltage signal of each sensor, performs an addition operation, and performs zero setting on a zero remanence offset to output a signal S1. After that, the signal has been conditioned. Before and after a magnetization remanence mark is detected, a characteristic waveform shown in FIG. 1 is output for the signal S1.

The device may further include a human-machine interface. The human-machine interface is disposed in the control system and serves as a channel for communication between a central processing unit (CPU) and an external input/output.

The device may further include an input unit 11. The input unit 11 mainly includes a button for parameter setting, and an external signal isolation circuit for inputting the information of the machine operation status, such as a start signal, a stop signal, and a length reset signal. The input unit 11 is connected to the control system 5 through the input/output interface 10 of the control system 5.

The device may further include a display unit 12 for performing the parameter setting and displaying data during meter counting. The display unit 12 is connected to the control system 5 through the input/output interface 10 of the control system 5.

The device may further include another input/output unit 13 for outputting a full-length signal and a fault alarm, another communication port for data sharing and access, and the like.

Figure 2:
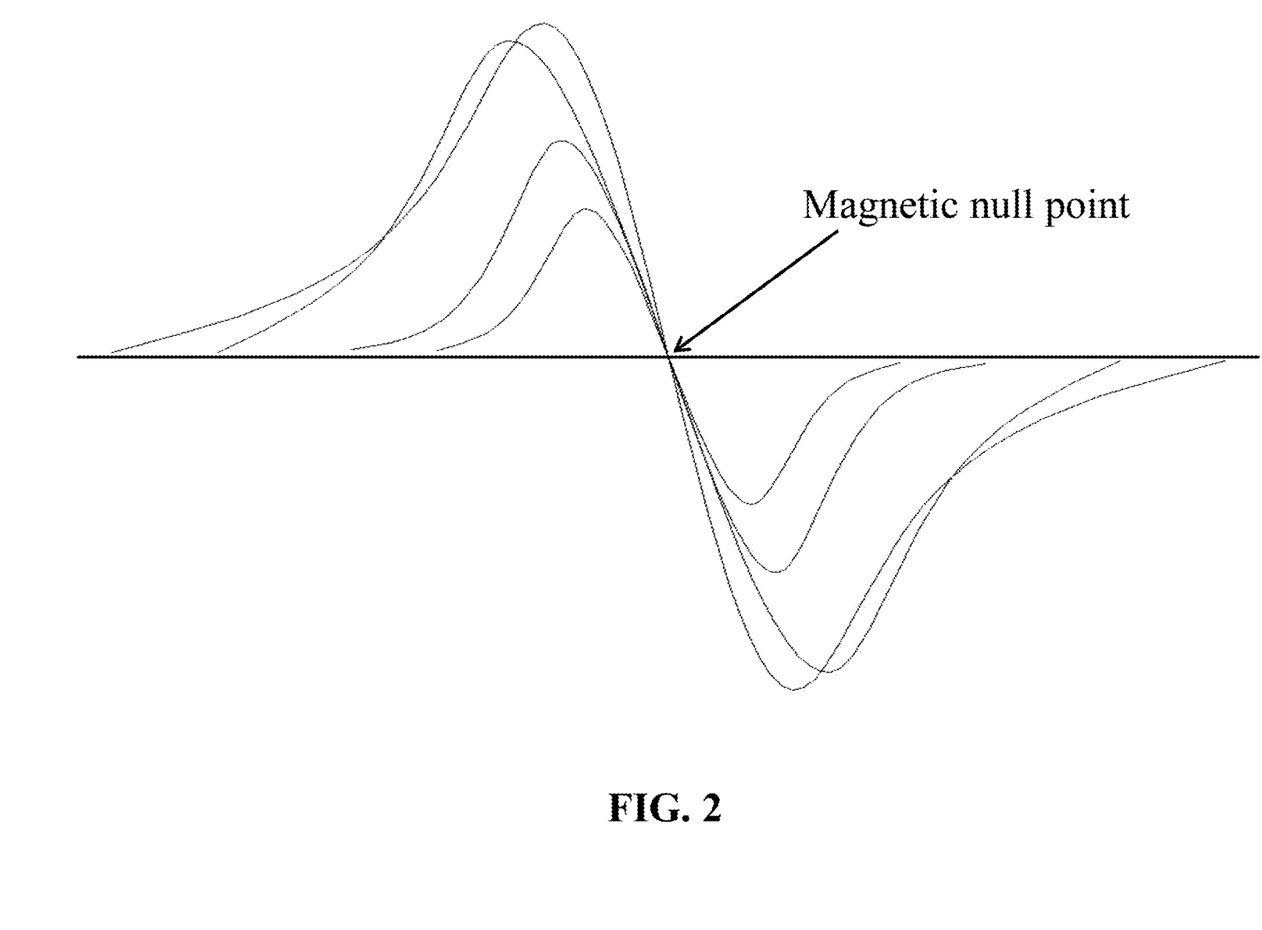
FIG. 2 shows voltage waveforms that each represent a characteristic waveform distribution of remanence and are obtained through processing after a magnetic-sensitive detector sensor in a method in the present disclosure performs detection on related circumferences of segments that are of four different steel wires and have been magnetized according to the method in the present disclosure.

A detection principle of the present disclosure is as follows:

When an excitation device is a solenoid, an equal-width and equal-amplitude narrow pulse voltage is applied to the solenoid to axially excite an advancing built-in steel wire that passes through the solenoid, such that remanence with a characteristic waveform is generated on the steel wire. Starting from zero, a magnetic field intensity of the remanence gradually increases to a maximum value in a direction, decreases to zero, gradually increases to a maximum value in an opposite direction (as shown in FIG. 2), and then gradually returns to a magnetic null point (as shown in FIG. 2). The remanence with a characteristic waveform is detected by an internally pass-through magnetic-sensitive detection sensor (as shown in FIG. 4) and its signal processing circuit, and converted into a corresponding electrical signal with a characteristic waveform distribution. A system compares and determines in real time whether the electrical signal is consistent with a point that is on the steel wire and corresponds to a specific position of the solenoid at a moment of excitation. When the electrical signal is determined to be consistent with the point on the steel wire, next excitation and magnetization is immediately triggered. In this way, cyclic excitation and detection is generated, achieving online high-precision meter counting. (This is a method for determining a to-be-excited point based on a waveform characteristic of the remanence.)

Finally, it should be noted that the above descriptions are only preferred embodiments of the present disclosure, and are not intended to limit the present disclosure. Although the present disclosure has been described in detail with reference to the foregoing embodiments, those skilled in the art may still modify the technical solutions described in the foregoing embodiments, or equivalently substitute some technical features thereof. Any modification, equivalent substitution, improvement, etc. within the spirit and principles of the present disclosure shall fall within the scope of protection of the present disclosure.

What is claimed is:

1. An electromagnetic non-contact online meter counting and speed measurement method for a steel wire, comprising:
    disposing an axial excitation device and an internally pass-through magnetic-sensitive detection sensor sequentially at intervals in an advancing direction of the steel wire;
    exciting the axial excitation device by a narrow pulse voltage to generate a magnetizing field, and enabling the steel wire to advance axially to enter the axial excitation device from one magnetic pole of the axial excitation device and come out of the axial excitation device from another magnetic pole of the axial excitation device, such that a steel wire segment inside the magnetizing field is magnetized axially to form a magnetized segment and generate local remanence with a characteristic waveform that is centered on a magnetic null point and axially symmetrical;

detecting, by the internally pass-through magnetic-sensitive detection sensor, a magnetic field intensity around the steel wire in real time, converting the magnetic field intensity into an electrical signal in real time, and transmitting the electrical signal to a control system; and enabling meter counting, exciting the axial excitation device for the first time to generate the magnetized segment containing the remanence with the characteristic waveform on the steel wire; enabling, by the control system after detecting the magnetized segment, null point comparison and detection of the remanence; detecting the magnetic null point, increasing, by the control system, a meter counting value by a value corresponding to one meter counting pitch, and issuing an excitation trigger command to the axial excitation device to enable next excitation and magnetic null point detection; and performing the excitation cyclically until the excitation is ended.

2. The electromagnetic non-contact online meter counting and speed measurement method for the steel wire according to claim 1, wherein when the steel wire advances axially and passes through the axial excitation device, an axial direction of the steel wire is parallel to a magnetic line of force at a center of a magnetic pole that generates the magnetizing field when the axial excitation device is excited.

3. The electromagnetic non-contact online meter counting and speed measurement method for the steel wire according to claim 1, wherein the axial excitation device is a solenoid, or symmetrical series-connected double electromagnet structures that are used as two poles, or a single electromagnet structure that extends a magnetic path to two symmetrical magnetic poles.

4. The electromagnetic non-contact online meter counting and speed measurement method for the steel wire according to claim 1, wherein the internally pass-through magnetic-sensitive detection sensor comprises a plurality of magnetic sensors uniformly arranged around the steel wire through a hole.

5. The electromagnetic non-contact online meter counting and speed measurement method for the steel wire according to claim 1, wherein for a part less than one stop length during parking, a walking length after last narrow pulse excitation during the parking is calculated based on a speed to make accurate compensation.

6. An electromagnetic non-contact online meter counting and speed measurement device for a steel wire, comprising an axial excitation device and an internally pass-through magnetic-sensitive detection sensor that are disposed sequentially at intervals in an advancing direction of a steel wire, and a control system, wherein the axial excitation device is excited by a narrow pulse voltage, and the internally pass-through magnetic-sensitive detection sensor detects remanence around the steel wire in real time, converts the remanence into an electrical signal in real time, and transmits the electrical signal to the control system; and the axial excitation device is excited for a first time to generate a magnetized segment containing remanence with a characteristic waveform on the steel wire to start meter counting; after detecting the magnetized segment, the control system enables null point comparison and detection of the remanence; the control system detects a magnetic null point, the control system increases a meter counting value by a value corresponding to one meter counting pitch, and the control system issues an excitation trigger command to the axial excitation device to enable next excitation and magnetic null point detection; and the axial excitation device performs cyclically until the excitation is ended.

7. The electromagnetic non-contact online meter counting and speed measurement device for the steel wire according to claim 6, wherein the axial excitation device is a solenoid, or symmetrical series-connected double electromagnet structures that are used as two poles, or a single electromagnet structure that extends a magnetic path to two symmetrical magnetic poles.

8. The electromagnetic non-contact online meter counting and speed measurement device for the steel wire according to claim 6, wherein the internally pass-through magnetic-sensitive detection sensor comprises a printed circuit board (PCB) with a circular through-hole, and magnetic sensors uniformly and equidistantly arranged around a center of the circular through-hole of the PCB.

9. The electromagnetic non-contact online meter counting and speed measurement device for the steel wire according to claim 6, wherein voltage signals of the internally pass-through magnetic sensors uniformly arranged in a circumferential direction are transmitted to a signal processing unit, the signal processing unit filters out a high-frequency interference wave from the voltage signals, performs an addition operation, performs zero setting on a remanence offset a the magnetic null point, and outputs a signal to a signal collection circuit, and the signal collection circuit is configured to receive the output signal from the signal processing unit and perform analog-to-digital (A/D) conversion on the received output signal and then transmit to the control system for calculation.

10. The electromagnetic non-contact online meter counting and speed measurement device for the steel wire according to claim 6, wherein the control system receives information from an input/output interface, comprising a relevant parameter setting, a machine operation status, and information of the internally pass-through magnetic sensors uniformly arranged in a circumferential direction, and analyzes and processes the information to complete high-accuracy meter counting.

11. The electromagnetic non-contact online meter counting and speed measurement device for the steel wire according to claim 10, wherein the relevant parameter setting of the control system comprises a distance from a center of the axial excitation device to the internally pass-through magnetic-sensitive detection sensor, and a stop length during fixed-length production.

12. The electromagnetic non-contact online meter counting and speed measurement device for the steel wire according to claim 6, wherein a narrow pulse generation unit comprises a processing unit, a communication interface circuit, a digital input port, a filtering and shaping circuit for high-speed digital signal conditioning, and a pulse output circuit; and the communication interface circuit is connected to the control system to receive a signal with a narrow pulse width, the digital input port is connected to an excitation trigger unit of the control system to receive an excitation pulse trigger command, and the pulse output circuit is connected to a receiving terminal of an excitation driving unit to output a narrow pulse control signal to the excitation driving unit.

13. The electromagnetic non-contact online meter counting and speed measurement device for the steel wire according to claim 12, wherein the excitation driving unit comprises a fast power switch transistor, a reverse discharge diode, a driving source connection point, the receiving terminal for receiving the pulse control signal, and an output terminal for outputting a power pulse voltage; and the receiving terminal for receiving the pulse control signal is connected to a trigger electrode of the fast power switch transistor, and when the narrow pulse control signal is at a high potential, the fast power switch transistor is turned on to output a narrow pulse voltage waveform; an output terminal of the fast power switch transistor is electrically connected to the output terminal of the excitation driving unit; and an anode of the reverse discharge diode is connected to the output terminal of the fast power switch transistor, and a cathode of the reverse discharge diode is connected to a positive terminal of a driving direct current (DC) source.

* * * * *